US006472641B2

(12) United States Patent
Suzuki

(10) Patent No.: US 6,472,641 B2
(45) Date of Patent: Oct. 29, 2002

(54) LAMP UNIT FOR LIGHT RADIATION TYPE HEATING AND PROCESSING DEVICE

(75) Inventor: Shinji Suzuki, Kawasaki (JP)

(73) Assignee: Ushiodenki Kabushiki Kaisha, Tokyo (JP)

( * ) Notice: Subject to any disclaimer, the term of this patent is extended or adjusted under 35 U.S.C. 154(b) by 122 days.

(21) Appl. No.: 09/749,896

(22) Filed: Dec. 29, 2000

(65) Prior Publication Data

US 2001/0007405 A1 Jul. 12, 2001

(30) Foreign Application Priority Data

Jan. 6, 2000 (JP) ....................................... 2000-005786

(51) Int. Cl.[7] .............................. H05B 1/00; A21B 1/00

(52) U.S. Cl. ....................... 219/411; 219/405; 313/115; 313/579

(58) Field of Search ................................ 219/411, 390, 219/405, 354, 347, 343; 118/725, 724; 313/579, 115; 392/416

(56) References Cited

U.S. PATENT DOCUMENTS 4,543,472 A * 9/1985 Arai et al. .................. 219/405
5,960,158 A * 9/1999 Gat et al. ................... 219/390
6,222,990 B1 * 4/2001 Guardado et al. .......... 118/724
6,288,368 B1 * 9/2001 Kawada et al. ............. 118/724

* cited by examiner

*Primary Examiner*—Don Wong
*Assistant Examiner*—Chuc Tran D
(74) *Attorney, Agent, or Firm*—Nixon Peabody LLP; David S. Safran

(57) ABSTRACT

There is provided a lamp unit for light radiating type heating device which allows efficient cooling of the lamps, and the temperature increase of a semiconductor wafer irradiated with the lamp unit is faster than in the prior art without the need of a complicated and large cooling structure. The lamp unit comprises a first group of lamps arranged in a first plane and a second group of lamps arranged in a second plane, wherein each group comprises a plurality of filament lamps and wherein said filament lamps are arranged such that their light emitting tubes form concentric circles having different diameters; and wherein said first plurality of filament lamps and said second plurality of filament lamps are arranged in a staggered manner having coincident centers; and a mirror for reflecting light emitted from said filament lamps, said mirror comprising grooves wherein the light emitting tubes of the filament lamps of the first group of lamps are arranged, and wherein the grooves are defined by side walls protruding from said mirror in the direction of the light emitting tubes of the filament lamps of the second group of lamps.

5 Claims, 7 Drawing Sheets

PRIOR ART

PRIOR ART

LAMP UNIT FOR LIGHT RADIATION TYPE HEATING AND PROCESSING DEVICE

BACKGROUND OF THE INVENTION

1. Field of the Invention

This invention relates to a lamp unit for a light radiating type heating device for heating and processing through light radiation in a process such as film formation, diffusion and annealing or the like of a workpiece such as a semiconductor wafer, and, more particularly, the invention relates to a lamp unit for a light radiating type heating device capable of performing a high speed heating and processing in an annealing step for a semiconductor wafer, for example, to form a shallow connection surface.

2. Description of the Related Art

In semiconductor manufacturing, a light radiating type heating device for performing heating and processing with light containing a large amount of infrared rays radiated from filament lamps is used in order to perform processing such as a film formation, a diffusion and an annealing or the like on the semiconductor wafer. Although all these processing steps comprise a heating operation for heating the semiconductor wafer up to a high temperature, application of a light radiation type heating and processing device enables the semiconductor wafer to be rapidly heated and to increase its temperature up to 1000° C. or more within tens and several seconds to several ten seconds, for example. In addition when the light radiation is stopped the semiconductor wafer can be cooled rapidly.

FIG. 1 shows a cross-sectional view of one example of a prior art light radiating type heating device. Filament lamps 4 to be described later are arranged in a lamp chamber 1, and a mirror 5 is installed behind the filament lamps 4. A light radiation chamber 2 and a quartz window 9 define this lamp chamber 1. Within the light radiation chamber 2, a semiconductor wafer W as the work piece to be heated and processed is mounted on a wafer holding block 3. In addition, a quartz window 9 is used in the case that the atmosphere near the semiconductor wafer W is different from the atmosphere in the lamp chamber 1.

One example of the filament lamp 4 is illustrated in FIG. 2, wherein a seal member for the filament lamp 4 is comprised of an annular light emitting tube 7 and a pair of inlet tubes 8 cooperatively arranged at a right angle to the end part of the light emitting tube 7, and a filament 12 having a tungsten raw wire wound in a helical form is installed within the light emitting tube 7. A seal section 11 is formed at the end part of each inlet tube 8, and the end part of the filament 12 and the lead wire 19 are connected in the seal section 11 through a molybdenum foil 11*a*. The sealed member is filled with a small amount of halogen gas together with inert gas. As shown in FIG. 3, the annular light emitting tubes 7 of the filament lamp 4 are constructed such that the light emitting tubes 7 of semi-circular or a circle segment or arcuate shape are combined to form a circular shape.

In FIG. 1, the light emitting tubes 7 are of circular shape, and a plurality of filament lamps 4 having different annular diameters D are arranged such that the light emitting tubes 7 are installed in a concentric manner around a center X of the circle. In FIG. 1, seven filament lamps 4 are used. The mirror 5 arranged behind the filament lamps 4 is made of metal, for example, aluminum, and there are provided some concentric grooves 13 covering the light emitting tubes 7 of the filament lamps 4 and passage holes 6 into which the inlet tubes 8 are inserted. The reflecting surface of the mirror 5 is provided with a metallic plating, for example, gold plating so as to attain a superior reflection of light.

The light emitting tube 7 of each of the filament lamps 4 is arranged and fitted in the concentric grooves of the mirror 5. In addition, the inlet tube 8 of each of the filament lamps 4 is inserted into the passage hole 6 of the mirror 5 and protrudes from the rear surface of the mirror 5, and a lead wire 19 is connected to an electrical circuit.

Accordingly, when electric power is fed to the filament lamps 4, a filament 12 may produce and radiate light. The light is reflected by the mirror 5 and radiated against the semiconductor wafer W within the light radiating chamber 2.

In recent years, it has become necessary to attain a high-integrated formation and ultra fine arrangement of a semiconductor integrated circuit, and it is most important to obtain a thin diffusion layer containing some impurities and to form a shallow junction surface during a stage in which the impurities are, for example, through ion implanting process, implanted into and diffused in the silicon crystal of the semiconductor wafer. The diffusion of impurities through the ion implanting process is carried out at an implanting stage in which the ionized impurities are accelerated by an electric field and physically implanted into the silicon crystal and also at an annealing stage in which the impurities are diffused in the crystal while damages to the crystal through implanting the impurities are repaired. It is necessary to restrict the diffusion of impurities in order to attain a thin diffusion layer in the annealing stage so as to form a shallow junction surface and further to obtain a thin diffusion layer. It is therefore necessary that the temperature increasing speed of the semiconductor wafer is higher than that of the prior art. If the temperature increasing speed is slow the annealing processing time is extended and the diffusion of the impurities exceeds a predetermined diffusion layer thickness which becomes too large. In turn, if the layer thickness of the diffusion layer is required to be in the range of 0.13 to 0.15 $\mu$m, for example, it becomes necessary to reach a temperature increasing speed of 150 to 200° C./sec.

However, in order to reach a faster temperature increasing speed than that of the prior art it is necessary to increase the lamp input density (the lamp input per unit area). In order to increase the lamp input density in the device shown in FIG. 1, one may think of arranging the lamps in several layers as shown in FIG. 4.

With such an arrangement as above, the projection of the arrangement of the filaments of the lamp on the radiation surface causes the density of the filaments to be increased as compared with that shown in FIG. 1 so that the lamp input density is increased. However, the lamp envelope is highly heated by the energy radiated from the adjoining lamps (either the lamp 7A or 7B in the same plane or lamps 7A and 7B in a different layer).

Although the envelope of the filament lamp 4 is made of quartz glass, the quartz glass absorbs light from the filament 12 and reaches a high temperature. When the temperature reaches 800° C. or more the quartz glass recrystallizes, begins to show white turbidness and loses its transparency. When the envelope loses its transparency the light from the filament 12 hardly passes through the envelope resulting in that the desired energy cannot be radiated against the semiconductor wafer W as the workpiece to be processed.

In order to prevent the envelope of the lamp from losing its transparency it is necessary to perform an efficient cooling of each of the lamps. However, as is apparent from FIG. 4, a lamp may be irradiated with light from four adjoining lamps so that a large stream of cooling air must be blown against a lamp so as to decrease the temperature of the envelope of the lamp down to a temperature where the loss of transparency can be prevented. Further, the cooling air has to be uniformly applied to any of the plurality of annular lamps. However, the components used for blowing a large stream of cooling air uniformly against the plurality of annular lamps or for discharging the air or the like are large in size and complicated.

SUMMARY OF THE INVENTION

In view of the foregoing, it is an object of the present invention to provide a lamp unit for a light radiating type heating device in which an efficient cooling of the lamps may easily be carried out and the temperature increase of a workpiece such as a semiconductor wafer is faster than in the prior art without making the cooling structure for the lamps complicated and large.

The object of the present invention is attained in a first embodiment by providing a lamp unit for a light radiating type heating device comprising a first group of lamps comprising a plurality of filament lamps, wherein each filament lamp has a light emitting tube arranged in a first plane and wherein said filament lamps are arranged such that their light emitting tubes form concentric circles having different diameters; and a second group of lamps comprising a plurality of filament lamps, wherein each filament lamp has a light emitting tube arranged in a second plane and wherein said filament lamps are arranged such that their light emitting tubes form concentric circles having different diameters, wherein said first plurality of filament lamps and said second plurality of filament lamps are arranged in a staggered manner having coincident centers; said lamp unit further comprising a mirror for reflecting light emitted from said filament lamps, said mirror comprising grooves wherein the light emitting tubes of the filament lamps of the first group of lamps are arranged, and wherein the grooves are defined by side walls protruding from said mirror in the direction of the light emitting tubes of the filament lamps of the second group of lamps.

In addition, in a preferred embodiment, the mirror is provided with at least one hole exclusively used for aeration in order to perform an efficient cooling of the lamps.

As described above, the present invention provides a lamp unit for a light radiating type heating device in which light emitting tubes form an annular shape and a plurality of filament lamps are arranged in the same plane in a concentric manner to constitute a group of lamps such that the light emitting tubes form concentric circles having different annular diameters and a plurality of groups of lamps are arranged in a staggered manner with their centers coincident with each other. Behind the rear surfaces of the light emitting tubes of the filament lamps a mirror is arranged, and the side walls of said mirror protrude between the filament lamps of one group of lamps up to the light emitting tubes of the filament lamps of another group of lamps so that the arrangement pitch of the filament lamps can be made small and the lamp input density can be increased without increasing each lamp input. Accordingly, the temperature increasing speed of the semiconductor wafer can be made fast as compared with that of the prior art and it becomes possible to serve the requirement of making a shallow junction surface at the annealing stage of the semiconductor wafer processing. The adjoining light emitting tubes within the same plane are partitioned by the side wall of the mirror and the adjoining light emitting tubes at the different height level (in different lamp planes) shield part of the radiated light resulting in that it is possible to reduce the degree of heat being absorbed by the adjoining filament lamps. Accordingly, it is not necessary to provide for a large and complicated cooling structure for the filament lamps as in the prior art.

In addition, since the mirror is provided with the exclusive holes for aeration and the entire lamp is air-cooled, it is possible to perform an efficient cooling of the lamps even if the lamp input is high, and further a loss of transparency of the lamp can be prevented.

DESCRIPTION OF THE PREFERRED EMBODIMENTS

Figure 1:
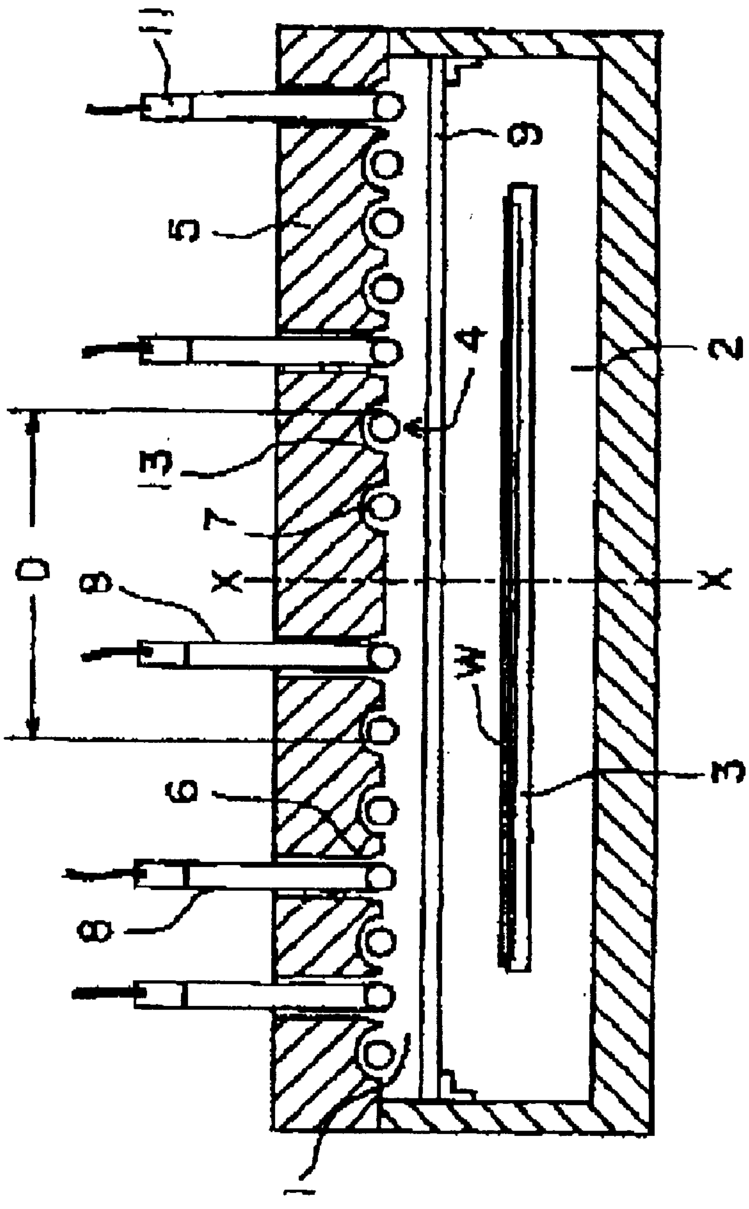
FIG. 1 is an illustrative sectional view showing a prior art light radiation type heating device.
Figure 2:
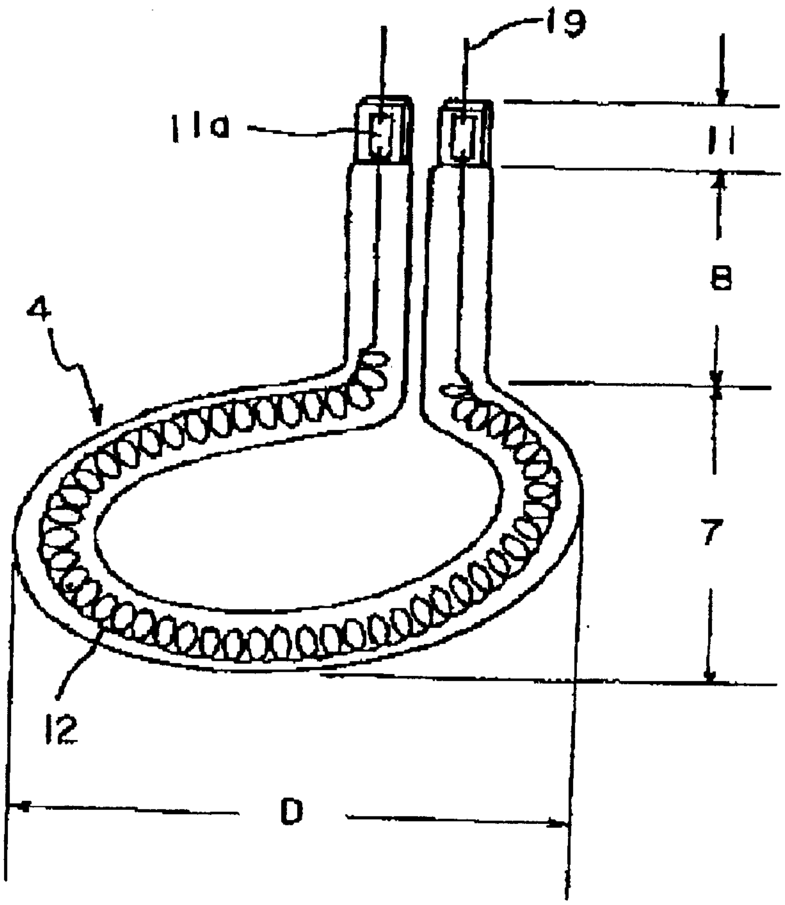
FIG. 2 PRIOR ART
FIG. 2 is a perspective view showing a filament lamp in which the light emitting tube has an annular form.
Figure 5:
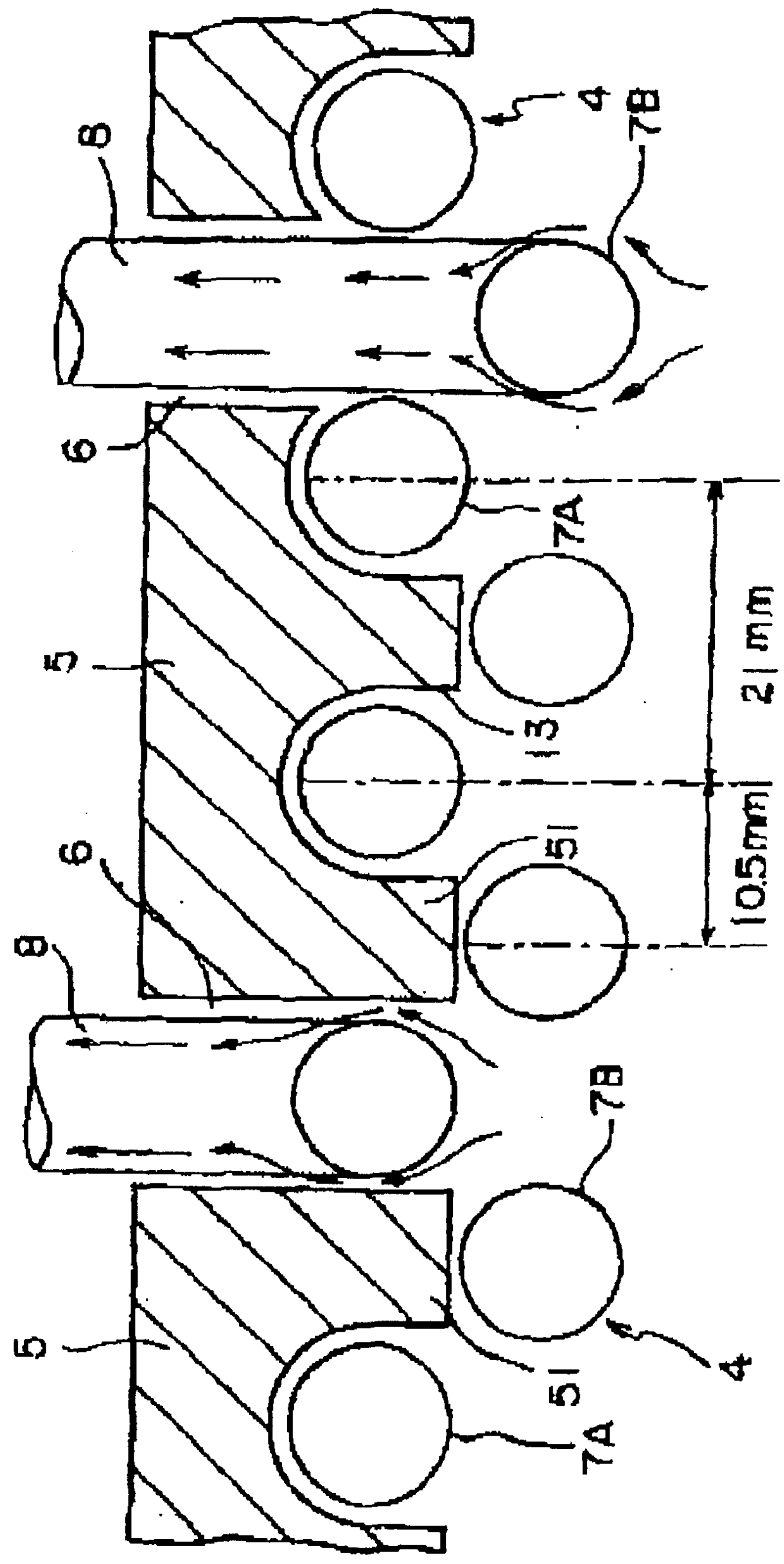
FIG. 5 is an illustrative sectional view showing an arrangement of lamps in one embodiment of the present invention.
Figure 6:
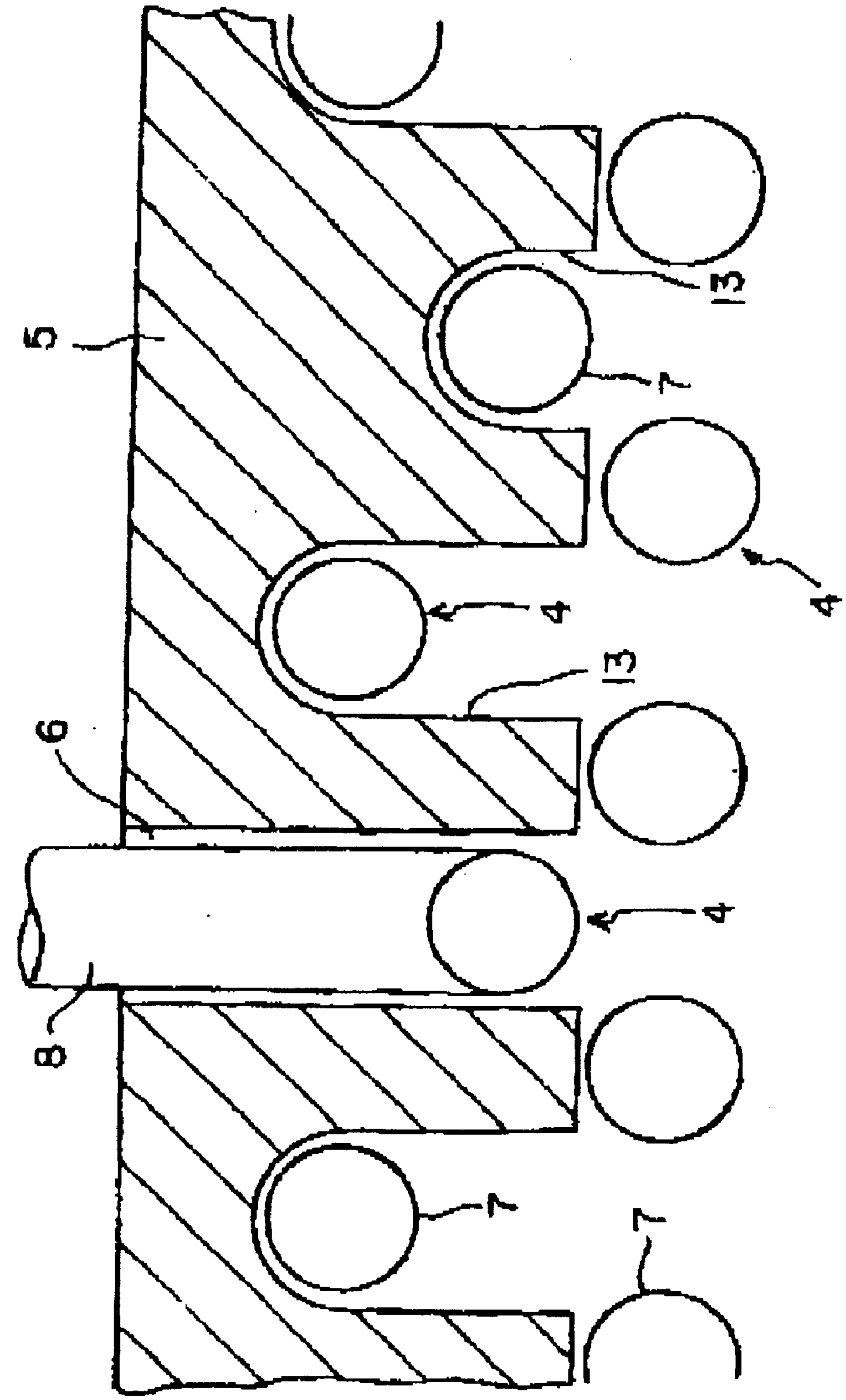
FIG. 6 is an illustrative sectional view showing an arrangement of lamps in another embodiment of the present invention.

Referring now to the drawings, preferred embodiments of the present invention will be described more practically. FIG. 5 shows an illustrative cross-sectional view showing a preferred embodiment of a lamp unit for a light radiating type heating device of the present invention. A light emitting tube 7A is of an annular shape, and a plurality of filament lamps 4 having light emitting tubes 7A with different diameters are arranged such that said light emitting tubes are installed in a concentric manner around a center X (not shown in the figure) of the annular structure. The light emitting tubes 7A are arranged in grooves 13 formed concentrically in the reflection surface of the mirror 5. These lamps constitute the first group of lamps. Principally the arrangement of the filament lamps 4 in the first group of lamps is the same as in the prior art. More practically, the filament lamps 4 have a tube diameter of 10 mm and the pitch between the light emitting tubes is 21 mm. The filaments in the light emitting tubes are not illustrated. Further, FIG. 5 shows only a part of the complete lamp unit, namely a part of either a right half or a left half from the center X with respect to the entire structure as shown in FIG. 1.

The light emitting tubes 7B also have an annular shape, and a plurality of filament lamps 4 with light emitting tubes 7B having different diameters are arranged such that said light emitting tubes are concentrically installed around the center X of the annular structure at positions opposite the end faces of side wall 51 of the mirror 5. These side walls 51 define the grooves 13 surrounding the light emitting tubes of the first group of lamps. The lamps 4 with light emitting tubes 7B facing the end faces of the mirror side walls 51 constitute the second group of lamps. The first group of lamps and the second group of lamps are arranged in a staggered manner. The center of each of the concentric circles is coincident with X, and the light emitting tubes 7A of the filament lamps 4 of the first group of lamps are positioned at the intermediate positions of the light emitting tubes 7B, between the nearest two of the filament lamps 4 of the second group of lamps.

That is, the light emitting tubes 7A of the first group of lamps and 7B of the second group of lamps are arranged in a zigzag form as can be seen in the sectional view of FIG. 5, and their level with respect to the position of the semiconductor wafer, i.e. their height levels with respect to the workpiece to be irradiated, different alternatingly from on filament lamp 4 to the next. The tube diameter of the filament lamp 4 of the second group of lamps is 10 mm, and they are arranged with a pitch of 21 mm. Accordingly, the pitch of the adjoining filament lamps 4 of the first group of lamps and the second group of lamps is 10.5 mm. Thus, the adjoining filament lamps 4 are nearly in contact with each other and the arrangement pitch is made much smaller than that of the prior art so that, when light is projected onto the surface to be irradiated, the lamp input density can be increased.

Figure 3:
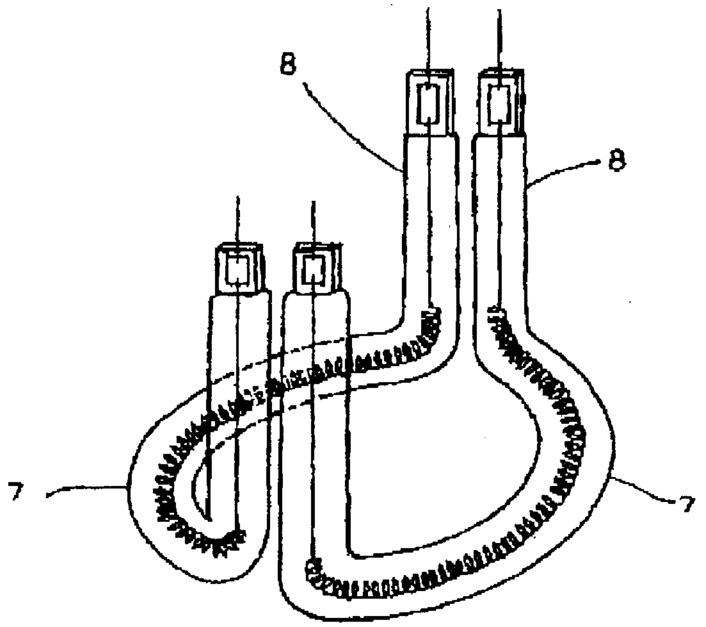
FIG. 3 is a perspective view showing a filament lamp having a semi-circular light emitting tube.

Further, the arrangement of the filament lamps 4 is not limited to the zigzag formation shown in FIG. 5. For example, there may be more than two layers of the filament lamps 4 (for example, three), and briefly it will be satisfactory that the height levels of the adjoining filament lamps 4 differ alternatingly. In addition, as described in FIG. 3 above, the annular light emitting tubes 7 of the filament lamp 4 may be replaced by light emitting tubes 7 of semi-circular or arcuate shape or they may have the form of a circle segment, and two or more of those tubes are then combined to give a circular shape.

In such a lamp unit as described above, since the arrangement pitch of the filament lamps 4 is small, it is possible to increase the lamp input density without increasing each lamp input. The lamp input density in the preferred embodiment with an arrangement pitch of 10.5 mm is 1.7 times higher as compared with that of the prior art with an arrangement pitch of 18 mm even if the lamp input is the same as in the prior art. More practically, when the filament lamps 4 having an electrical power consumption of 80 W/cm are arranged with a pitch of 10.5 mm and lit, it is possible to increase the temperature of a semiconductor wafer at a speed of about 150° C./sec so that it can be adapted to the requirement of making a shallow junction surface in the annealing stage of the semiconductor wafer processing, for example.

Figure 4:
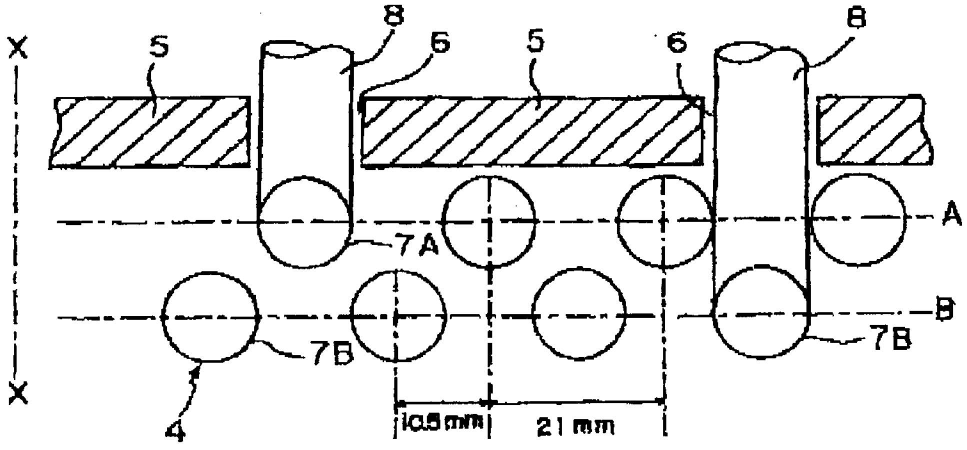
PRIOR ART FIG. 4
FIG. 4 is an illustrative view showing a case in which the lamps are arranged in several stages.

In addition, as apparent from FIG. 5, the light emitting tubes 7A are spaced apart by side walls 51 and therefore they are not heated by one another. Further, the light emitting tubes 7A and 7*b* adjoining each other in different height levels are placed such that the degree of heat from the adjoining filament lamps 4 absorbed by the envelopes is lower than that shown in FIG. 4 due to the fact that a part of the radiated light is shielded by the side walls 51. Accordingly, it is not necessary to make the cooling structure for the lamps larger and more complicated than in the prior art.

Figure 7A:
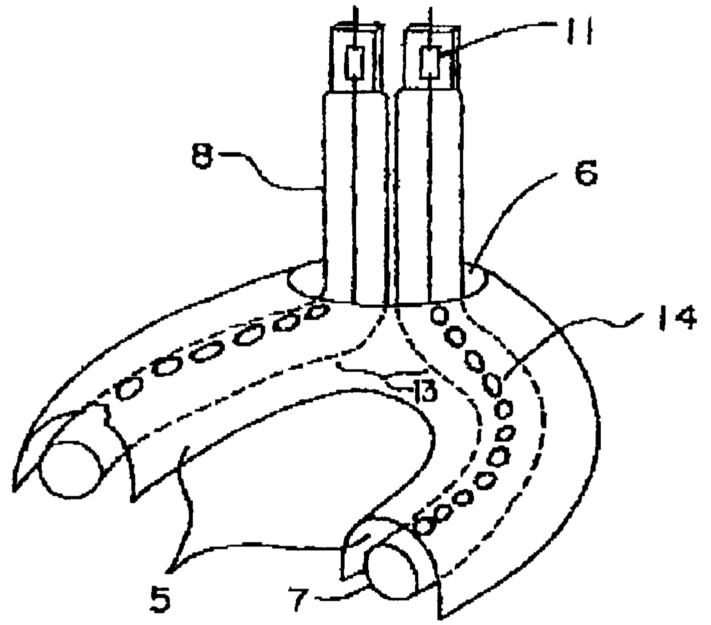
FIGS. 7(*a*) and 7(*b*) are illustrative views showing holes exclusively used for aeration arranged in a mirror.
Figure 7B:
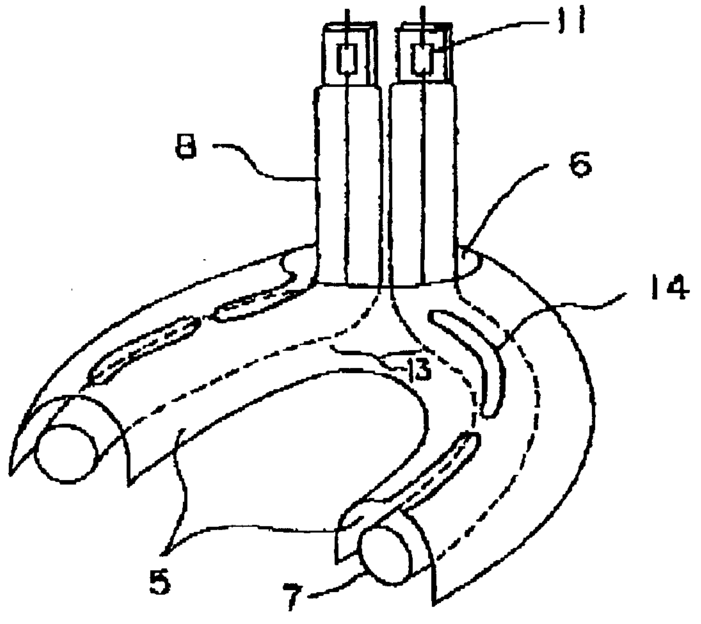
Figure 8:
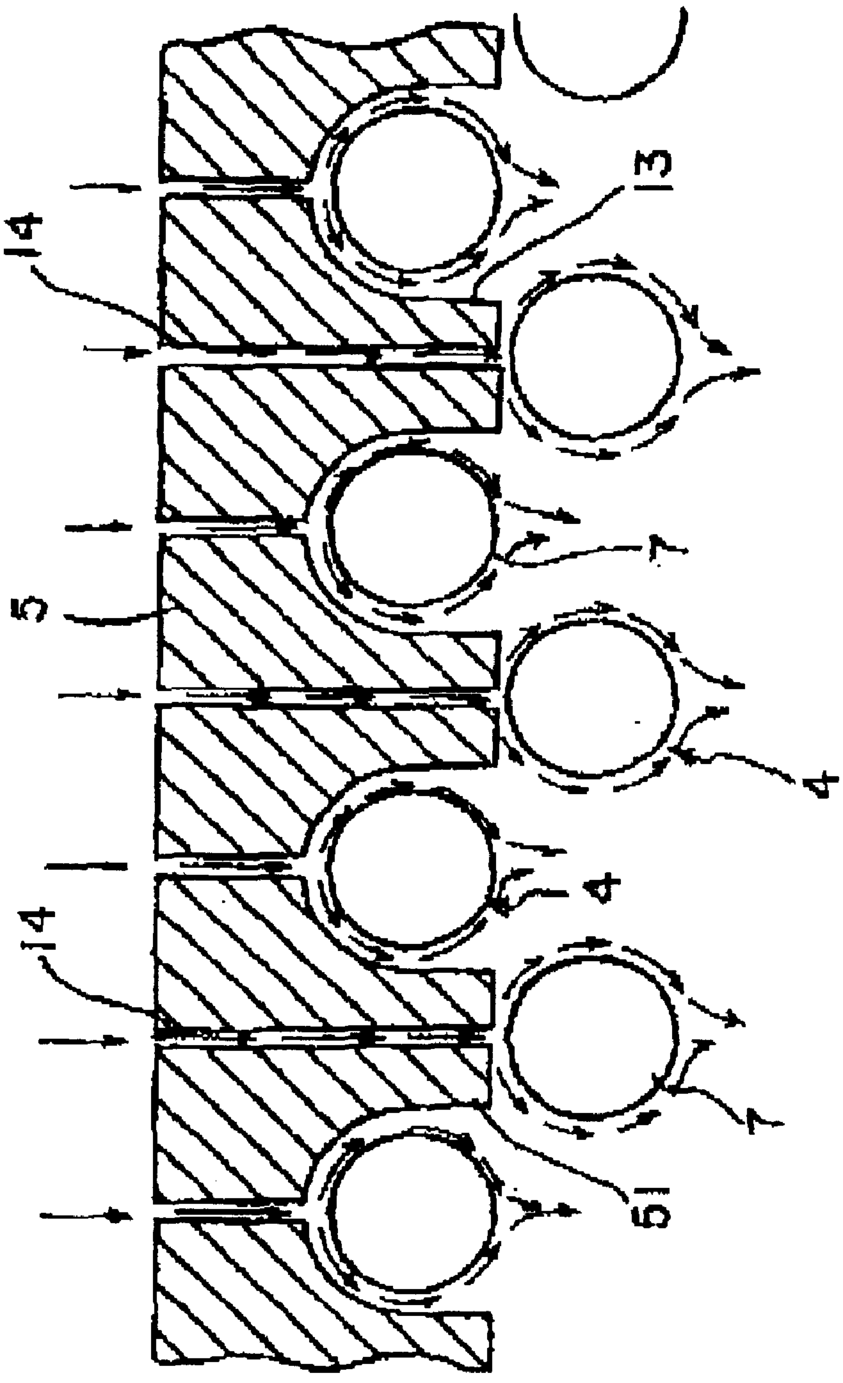
FIG. 8 is an illustrative sectional view showing the flow of cooling air.

As shown in FIG. 5, cooling for the filament lamps 4 can be carried out by discharging cooling air through the passage holes 6 in the mirror 5 in the same manner as in the prior art. It is however preferable to provide the grooves 13 of the mirror 5 with round holes shown in FIG. 7(A) or exclusive holes 14 for aeration, for example in the form of slit holes as shown in FIG. 7(B). In FIG. 7, only the reflecting surface of the mirror 5 is shown. As can betaken from FIG. 8, the cooling air from a blowing device (not shown) can either be blown through the exclusive holes 14 for aeration or discharged through them, the cooling air flows along the grooves 13 of the mirror 5 so that the respective filament lamps 4 are efficiently cooled. Therefore, irrespective of the small arrangement pitch of the filament lamps 4, the loss of transparency of the lamps can be effectively prevented. As described above, the present invention provides a lamp unit for a light radiating type heating device comprising a first group of lamps with a plurality of filament lamps, wherein each filament lamp has a light emitting tube arranged in a first plane and wherein said filament lamps are arranged such that their light emitting tubes form concentric circles having different diameters; and a second group of lamps comprising a plurality of filament lamps, wherein each filament lamp has a light emitting tube arranged in a second plane and wherein said filament lamps are arranged such that their light emitting tubes form concentric circles having different diameters, wherein said first plurality of filament lamps and said second plurality of filament lamps are arranged in a staggered manner having coincident centers; and a mirror for reflecting light emitted from said filament lamps, said mirror comprising grooves wherein the light emitting tubes of the filament lamps of the first group of lamps are arranged, and wherein the grooves are defined by side walls protruding from said mirror in the direction of the light emitting tubes of the filament lamps of the second group of lamps. As a result, the arrangement pitch of the filament lamps is small and the lamp input density can be increased without increasing the lamp input. Accordingly, the temperature increasing speed of the semiconductor wafer can be made fast as compared with that of the prior art and it becomes possible to obtain a shallow junction surface in the annealing stage of the semiconductor wafer processing. The adjoining light emitting tubes within the same plane are partitioned by the side walls of the mirror, and for the adjoining light emitting tubes in a different height level (lamp plane) the side walls shield part of the radiated light resulting in that it is possible to reduce the degree of heat absorption by the lamp envelopes from the adjoining filament lamps compared with the heat absorption in the prior art devices. Accordingly, it is not necessary to provide a large and complicated cooling structure for the filament lamps as in the prior art.

In addition, since the mirror is provided with holes which are exclusively used for aeration and the entire lamp is air-cooled, it is possible to perform an efficient cooling of the lamps even if the lamp input is high, and it is possible to prevent the loss of transparency of the lamps.

I claim:

1. A lamp unit for a light radiating type heating device comprising:

a first group of lamps comprising a plurality of filament lamps, wherein each filament lamp has a light emitting tube arranged in a first plane and wherein said filament lamps are arranged such that their light emitting tubes form concentric circles having different diameters; and a second group of lamps comprising a plurality of filament lamps, wherein each filament lamp has a light emitting tube arranged in a second plane and wherein said filament lamps are arranged such that their light emitting tubes form concentric circles having different diameters, wherein said first plurality of filament lamps and said second plurality of filament lamps are arranged in a staggered manner having coincident centers;

and a mirror for reflecting light emitted from said filament lamps, said mirror comprising grooves wherein the light emitting tubes of the filament lamps of the first group of lamps are arranged, and wherein the grooves are defined by side walls protruding from said mirror in the direction of the light emitting tubes of the filament lamps of the second group of lamps.

2. A lamp unit for a light radiating type heating device according to claim 1, in which said mirror is provided with aeration passages.

3. A lamp unit for a light radiating type heating device according to claim 2, wherein there is at least on aeration passage for each filament lamp.

4. A lamp unit for a light radiating type heating device according to claim 3, wherein there is at least one slit-like passage hole extending through the mirror along the apex of the grooves.

5. A lamp unit for a light radiating type heating device according to claim 3, wherein there are slit-like passage holes extending through the side walls of the mirror.

* * * * *